(12) United States Patent
Casey et al.

(10) Patent No.: US 8,140,418 B1
(45) Date of Patent: Mar. 20, 2012

(54) CARDHOLDER-NOT-PRESENT AUTHORIZATION

(75) Inventors: Brandon J Casey, San Jose, CA (US); Gary Wipfler, Los Altos, CA (US); Erik Cressall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 12/351,687

(22) Filed: Jan. 9, 2009

(51) Int. Cl.
*G06Q 40/00* (2006.01)

(52) U.S. Cl. ............... 705/35; 705/39; 705/40; 705/44; 705/64; 705/67; 705/318; 705/325; 709/227; 455/518; 370/401; 379/77

(58) Field of Classification Search .............. 705/35, 705/39, 40, 67, 64, 44, 318, 325; 709/227; 455/518; 370/401; 379/77
See application file for complete search history.

(56) References Cited

U.S. PATENT DOCUMENTS

| | | | |
|---|---|---|---|
| 5,953,710 A | 9/1999 | Fleming | |
| 6,609,113 B1 | 8/2003 | O'Leary et al. | |
| 6,749,114 B2 | 6/2004 | Madani | |
| 6,903,681 B2 | 6/2005 | Faris | |
| 7,249,092 B2 | 7/2007 | Dunn et al. | |
| 7,331,518 B2 | 2/2008 | Rable | |
| 7,333,947 B2 | 2/2008 | Wiebe et al. | |
| 7,357,310 B2 | 4/2008 | Calabrese et al. | |
| 7,904,360 B2 * | 3/2011 | Evans .......................... | 705/35 |
| 2002/0082995 A1 | 6/2002 | Christie, IV | |
| 2003/0028481 A1 | 2/2003 | Flitcroft et al. | |
| 2003/0135463 A1 | 7/2003 | Brown | |
| 2004/0034598 A1 | 2/2004 | Robinson | |
| 2004/0083394 A1 | 4/2004 | Brebner | |
| 2005/0246278 A1 | 11/2005 | Gerber et al. | |
| 2006/0006226 A1 | 1/2006 | Fitzgerald et al. | |
| 2006/0010042 A1 | 1/2006 | Gianakis et al. | |
| 2006/0031162 A1 | 2/2006 | Brundage et al. | |
| 2006/0074698 A1 | 4/2006 | Bishop et al. | |
| 2006/0085357 A1 | 4/2006 | Pizarro | |
| 2006/0105742 A1 | 5/2006 | Kim et al. | |

(Continued)

FOREIGN PATENT DOCUMENTS

EP 1696626 8/2006

(Continued)

OTHER PUBLICATIONS

Ilium Software, "Users Guide and Reference: Version 6.1," Jul. 2008 (available electronically at: www.iliumsoft.com/dl/doc/eWallet.pdf (accessed Apr. 9, 2009)).

(Continued)

*Primary Examiner* — Harish T. Dass
(74) *Attorney, Agent, or Firm* — Fletcher Yoder PC

(57) ABSTRACT

There is provided a method and system for real-time authorization of cardholder-not-present transactions. An authorization request application may be implemented on an electronic device, such as a cellular phone, a personal media player, or a computer. A cardholder may register a card account, such as a credit account, a debit account, a gift card account, and so forth, for participation in the real-time authorization program. The cardholder may then receive authorization requests when cardholder-not-present transactions are attempted. Via the authorization request application, the cardholder may approve or decline the authorization request. In addition, the cardholder may configure settings for automatically responding to missed authorization requests. The authorization request application may also allow the cardholder to flag automatically approved requests as unauthorized within a certain time period after an automatic approval response is sent, thereby enabling prompt detection of fraudulent activity.

16 Claims, 13 Drawing Sheets

U.S. PATENT DOCUMENTS

| | | |
|---|---|---|
| 2006/0131390 A1 | 6/2006 | Kim |
| 2007/0118475 A1 | 5/2007 | Picciallo et al. |
| 2007/0198411 A1* | 8/2007 | Kavanagh et al. .............. 705/44 |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010193 A1 | 1/2008 | Rackley, III et al. |
| 2008/0010204 A1 | 1/2008 | Rackley, III et al. |
| 2008/0016232 A1 | 1/2008 | Yared |
| 2008/0027844 A1 | 1/2008 | Little et al. |
| 2008/0040265 A1 | 2/2008 | Rackley, III et al. |
| 2008/0078831 A1 | 4/2008 | Johnson et al. |
| 2008/0108324 A1 | 5/2008 | Moshir |
| 2008/0126145 A1 | 5/2008 | Rackley |
| 2008/0162346 A1 | 7/2008 | Aaron |
| 2008/0166998 A1 | 7/2008 | Sun et al. |
| 2008/0207203 A1 | 8/2008 | Arthur et al. |
| 2008/0208743 A1 | 8/2008 | Arthur |
| 2008/0288405 A1* | 11/2008 | John .............................. 705/44 |
| 2009/0098854 A1 | 4/2009 | Park |

FOREIGN PATENT DOCUMENTS

| | | |
|---|---|---|
| JP | 2007323613 | 12/2007 |

OTHER PUBLICATIONS

U.S. Appl. No. 12/351,714, filed Jan. 9, 2009, Casey et al.
U.S. Appl. No. 12/351,649, filed Jan. 9, 2009, Casey et al.
U.S. Appl. No. 12/351,674, filed Jan. 9, 2009, Casey et al.
U.S. Appl. No. 12/351,724, filed Jan. 9, 2009, Casey et al.

* cited by examiner

CARDHOLDER-NOT-PRESENT AUTHORIZATION

BACKGROUND

1. Technical Field

The present disclosure relates generally to transaction authorizations and, more particularly, to authorizing cardholder-not-present transactions via an electronic device.

2. Description of the Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Card purchases, such as via credit cards, debit cards, gift cards, and the like, may often be made in person or remotely. For example, an in-person transaction may involve handing a card to a store clerk or swiping a card through a point-of-sale system. In-person transactions may be facilitated by an identity verification process, such as, for example, showing the store clerk a picture identification, signing a receipt, and/or entering a personal identification number. Cardholder-present transactions rely upon several security mechanisms to deter fraud, including a physical card with raised numbers, holographic images, signature line, card verification values embedded within the payment card's magnetic stripe, and/or various information protection mechanisms embedded into integrated circuits.

In contrast, remote transactions may occur without identity verification or physical fraud deterrents found in modern payment cards. For example, a consumer may purchase an item online or via the telephone without presenting a physical card to the vendor. These transactions may be known as cardholder-not-present, card-not-present, or customer-not-present transactions because the customer and card are not present at the point of sale. Cardholder-not-present transactions may be more susceptible to fraudulent abuse than traditional in-person transactions because the purchaser's identity is not verified. That is, the purchaser may be required to enter the card number and a security number located on the card; however, this information may be easily copied off of a card and used in a fraudulent manner. In addition, although a billing address may be requested and compared to the billing address associated with a card, goods may be shipped to addresses other than the billing address.

Accordingly, a card owner may not realize that a fraudulent cardholder-not-present transaction has occurred until a billing statement is received. It is generally preferable to detect the fraudulent activity as soon as possible so that additional use of the card may be prevented. It stands to reason, and widely publicized studies corroborate the fact, that losses can be more easily recouped when the fraud is timely discovered. While a consumer may be at least partially protected from liability when fraud has occurred, the issuing bank, acquiring bank, or merchant may bear the loss if goods have been sent to an unauthorized card user. These costs are passed on to the consumer in the form of higher prices on goods and services, higher banking fees, and higher interest rates. In addition, even if the consumer is ultimately not held responsible for unauthorized charges, it may still be very time-consuming and frustrating to have the charges reversed. For many consumers, the theft of one's financial identity has a demoralizing psychological affect. Therefore, it may be desirable to reduce the possibility of fraud in cardholder-not-present transactions.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

Accordingly, there is provided an electronic device for real-time authorization of cardholder-not-present transactions. The electronic device may be a handheld device, such as a cellular phone or a personal media player, or it may be a computer, such as a desktop computer or a laptop computer. Regardless of the form the electronic device takes, the device may run an application enabling a cardholder to approve or decline cardholder-not-present transactions in real time, near real-time, or after the transaction is initially authorized or settled. That is, in addition to a card transaction being sent to an issuing bank for approval, details of the transaction may be sent to the cardholder for approval before the transaction is authorized. If the cardholder does not recognize the transaction, it may be declined immediately, thereby preventing the cardholder and the merchant from becoming victims of identity theft.

Additionally, if the cardholder does not respond to an authorization request in real-time (i.e., within a short period of time), the authorization request may be responded to automatically based on customizable settings configured by the cardholder. For example, the cardholder may enable automatic approval of all missed authorizations. In another example, the cardholder may enable automatic approval of only transactions below a certain value and/or with certain merchants. Many automatic response settings may be available, and the cardholder may be able to combine the settings, for example, so that transactions up to a first value are automatically approved at a first merchant, while transactions up to a second value different from the first value are automatically approved at the second merchant.

Further, even after an authorization response has been sent to the issuing bank or credit card association (e.g., Visa, MasterCard, American Express, and so forth), the cardholder may flag an approved transaction as unauthorized. In this way, the cardholder may quickly notify the issuing bank, the credit card association, the acquiring bank, and/or the merchant that a previously approved transaction is fraudulent. If the merchant has not yet shipped goods purchased in the transaction, the merchant may cancel the flagged transaction, thereby avoiding a potentially costly loss. The issuing bank, once notified of the fraudulent activity, may choose to contact the cardholder to determine whether the card should be cancelled to prevent potential further fraud. In other embodiments, the payment application may display the issuing bank's customer service phone number to expedite the process of resolving the fraud and preventing further misuse of the cardholder's account information.

This functionality may be combined with parental controls, enabling parents to provide children with credit, debit, or prepaid cards, while allowing unauthorized or inappropriate charges to be identified and declined before goods are shipped or services rendered. See, for example, Casey et al., U.S. patent application Ser. No. 12/351,724, entitled "Parental Controls," filed on the same date as the present application, the entirety of which is herein incorporated by reference for all purposes. This cardholder-not-present authorization functionality may also be combined with a distinctive gesture, such as a reverse swipe of a virtual control on a touchscreen and/or acceptance of a modal confirmation dialog, to reduce the possibility of a transaction being accidentally declined and/or to reasonably ensure that the end user understands and accepts that he or she is declining a fraudulent financial transaction or authorizing a legitimate transaction. See, for example, Casey et al., U.S. patent application Ser. No. 12/351,714, entitled "Motion Based Payment Confirmation," filed on the same date as the present application, the entirety of which is herein incorporated by reference for all purposes.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
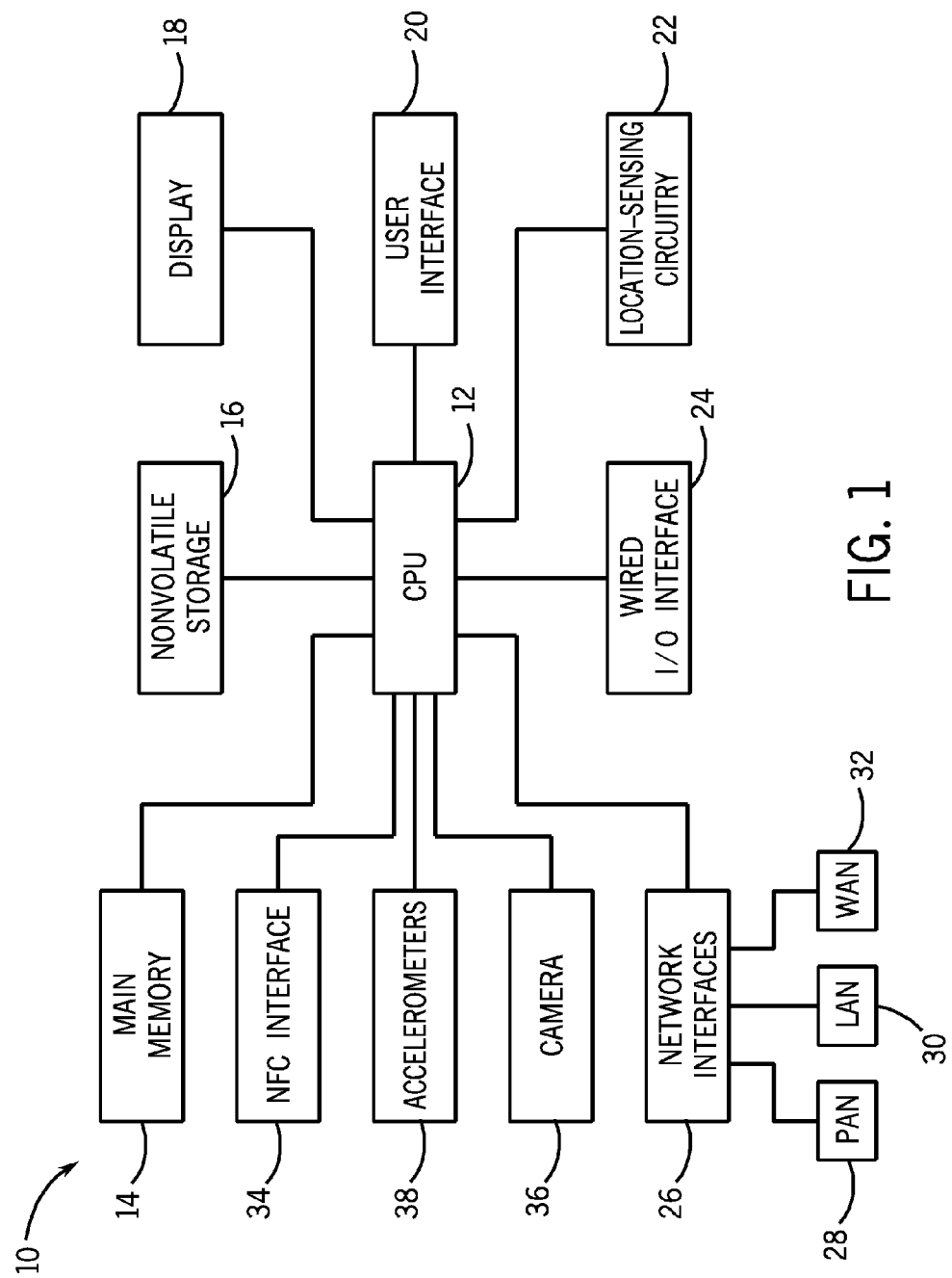
FIG. 1 is a block diagram of an electronic device in accordance with aspects of the present disclosure.

Turning first to FIG. 1, an electronic device 10 may be configured for verifying authorization of cardholder-not-present transactions. As discussed below with reference to FIGS. 2-7, the electronic device 10 may be, among other things, a handheld device, a computer, or a media player adapted to enable a user to review and approve or cancel cardholder-not-present transactions using techniques described in greater detail below. As such, the electronic device 10 may be, for example, an iPhone®, iPod®, iMac®, or MacBook®, available from Apple Inc., or similar devices by any manufacturer. It should be appreciated that embodiments of the electronic device 10 may include more or fewer elements than those shown in FIG. 1.

The electronic device 10 may include at least one central processing unit (CPU) 12. For example, the CPU 12 may include one or more microprocessors, and the microprocessors may be "general purpose" microprocessors, a combination of general and special purpose microprocessors, or ASICS. Additionally or alternatively, the CPU 12 may include one or more reduced instruction set (RISC) processors, video processors, or related chip sets. The CPU 12 may provide processing capability to execute an operating system, run various applications, and/or provide processing for one or more of the techniques described herein. Exemplary applications that may run on the electronic device 10 include a music player, a video player, a picture displayer, a calendar, an address book, an email client, a telephone dialer, and so forth. In addition, software for reviewing and approving or cancelling cardholder-not-present transactions may be included on the electronic device 10, as described below.

A main memory 14 may be communicably coupled to the CPU 12, which may store data and executable code. The main memory 14 may represent volatile memory such as RAM, but may also include nonvolatile memory, such as read-only memory (ROM) or flash memory. In buffering or caching data related to operations of the CPU 12, the main memory 14 may store data associated with open applications running on the electronic device 10.

The electronic device 10 may also include nonvolatile storage 16. The nonvolatile storage 16 may represent any suitable nonvolatile storage medium, such as a hard disk drive or nonvolatile memory, such as flash memory. Being well-suited to long-term storage, the nonvolatile storage 16 may store data files such as media (e.g., music files, video files, pictures, etc.), software (e.g., for implementing functions on the electronic device 10), preference information (e.g., media playback preferences, desktop background image, ringtones, etc.), transaction information (e.g., credit card data, records of transactions, etc.), wireless connection information (e.g., wireless network names and/or passwords, cellular network connections, etc.), subscription information (e.g., a record of podcasts, television shows, or other media to which a user subscribes), as well as personal information (e.g., contacts, calendars, email, etc.).

In certain embodiments, a display 18 of the electronic device 10 may display images and/or data. The display 18 may be any suitable display, such as a liquid crystal display (LCD), a light emitting diode (LED) based display, an organic light emitting diode (OLED) based display, a cathode ray tube (CRT) display, or an analog or digital television. In some embodiments, the display 18 may include touch screen or multi-touch screen technology through which a user may interface with the electronic device 10.

The electronic device 10 may further have a user interface 20. The user interface 20 may include, for example, indicator lights, user inputs, and/or a graphical user interface (GUI) on the display 18. In practice, the user interface 20 may operate via the CPU 12, using memory from the main memory 14 and long-term storage in the nonvolatile storage 16. In an embodiment lacking the display 18, indicator lights, sound devices, buttons, and other various input/output (I/O) devices may allow a user to interface with the electronic device 10. In an embodiment having a GUI, the user interface 20 may provide interaction with interface elements on the display 18 via certain user input structures, user input peripherals such as a keyboard or mouse, or a touch sensitive implementation of the display 18.

At a given time, one or more applications may be open and accessible to a user via the user interface 20 and/or displayed on the display 18 of the electronic device 10. The applications may run on the CPU 12 in conjunction with the main memory 14, the nonvolatile storage 16, the display 18, and the user interface 20. Various data may be associated with each open application.

A user may employ the electronic device 10 to review and approve or cancel cardholder-not-present transactions. As such, it should be appreciated that the instructions for carrying out such techniques may represent a standalone application, a function of the operating system of the electronic device 10, or a function of the hardware of the CPU 12, the main memory 14, the nonvolatile storage 16, or other hardware of the electronic device 10.

In certain embodiments, the electronic device 10 may include location sensing circuitry 22. The location sensing circuitry 22 may represent global positioning system (GPS) circuitry, but may also represent one or more algorithms and databases, stored in the nonvolatile storage 16 or main memory 14 and executed by the CPU 12, which may be used to infer location based on various observed factors. For example, the location sensing circuitry 22 may include an algorithm and database used to approximate geographic location based on the detection of local wireless networks (e.g., 802.11x, otherwise known as Wi-Fi) or nearby cellular phone towers. The location sensing circuitry 22 may be used by the electronic device 10 to determine a user's location during an event; the location during the event may then affect and/or determine the information displayed on the electronic device 10.

With continued reference to FIG. 1, the electronic device 10 may also include a wired input/output (I/O) interface 24 for a wired interconnection between one electronic device 10 and another electronic device 10. The wired I/O interface 24 may be, for example, a universal serial bus (USB) port or an IEEE 1394 port (e.g., FireWire®, available from Apple Inc.), but may also represent a proprietary connection. Additionally, the wired I/O interface 24 may permit a connection to peripheral user interface devices, such as a keyboard or a mouse.

One or more network interfaces 26 may provide additional connectivity for the electronic device 10. The network interfaces 26 may include, for example, one or more network interface cards (NIC) or a network controller. In certain embodiments, the network interface 26 may include a personal area network (PAN) interface 28. The PAN interface 28 may provide capabilities to network with, for example, a Bluetooth® network, an IEEE 802.15.4 (e.g., ZigBee) network, or an ultra wideband (UWB) network. As should be appreciated, the networks accessed by the PAN interface 28 may, but do not necessarily, represent low power, low bandwidth, or close range wireless connections. The PAN interface 28 may permit one electronic device 10 to connect to another local electronic device 10 via an ad-hoc or peer-to-peer connection. However, the connection may be disrupted if the separation between the two electronic devices 10 exceeds the range of the PAN interface 28.

The network interface 26 may also include a local area network (LAN) interface 30. The LAN interface 30 may be, for example an interface to a wired Ethernet-based network or an interface to a wireless LAN, such as a Wi-Fi network. The range of the LAN interface 30 may generally exceed the range available via the PAN interface 28. Additionally, in many cases, a connection between two electronic devices 10 via the LAN interface 30 may involve communication through a network router or other intermediary device.

Additionally, for some embodiments of the electronic device 10, the network interfaces 26 may include the capability to connect directly to a wide area network (WAN) via a WAN interface 32. The WAN interface 32 may permit a connection to a cellular data network, such as the Enhanced Data rates for GSM Evolution (EDGE) network, a 3G network, or another cellular network. When connected via the WAN interface 32, the electronic device 10 may remain connected to the Internet and, in some embodiments, to another electronic device 10, despite changes in location that might otherwise disrupt connectivity via the PAN interface 28 or the LAN interface 30. As will be discussed below, the wired I/O interface 24 and the network interfaces 26 may represent high-bandwidth communication channels for transferring user data using the simplified data transfer techniques discussed herein.

Certain embodiments of the electronic device 10 may also include a near field communication (NFC) interface 34. The NFC interface 34 may allow for extremely close range communication at relatively low data rates (e.g., 424 kb/s), and may comply with such standards as ISO/IEC 18092, ECMA-340, ISO/IEC 21481, ECMA-352, ISO 14443, and/or ISO 15693. The NFC interface 34 may have a range of approximately 2-4 cm. The close range communication with the NFC interface 34 may take place via magnetic field induction, allowing the NFC interface 34 to communicate with other NFC interfaces 34 or to retrieve information from tags having radio frequency identification (RFID) circuitry. As described below, the NFC interface 34 may enable initiation and/or facilitation of data transfer of from one electronic device 10 to another electronic device 10.

The electronic device 10 of FIG. 1 may also include a camera 36. With the camera 36, the electronic device 10 may obtain digital images and/or videos. In combination with optical character recognition (OCR) software, barcode-reading software, or QR-code-reading software running on the electronic device 10, the camera 36 may be used to input data from printed materials having text or barcode information.

In addition, in certain embodiments of the electronic device 10, one or more accelerometers 38 may be included which sense the movement and/or orientation of the electronic device 10. The accelerometers 38 may provide input or feedback regarding the position of the electronic device 10 to certain applications running on the CPU 12. By way of example, the accelerometers 38 may include a 3-axis accelerometer from ST Microelectronics.

Figure 2:
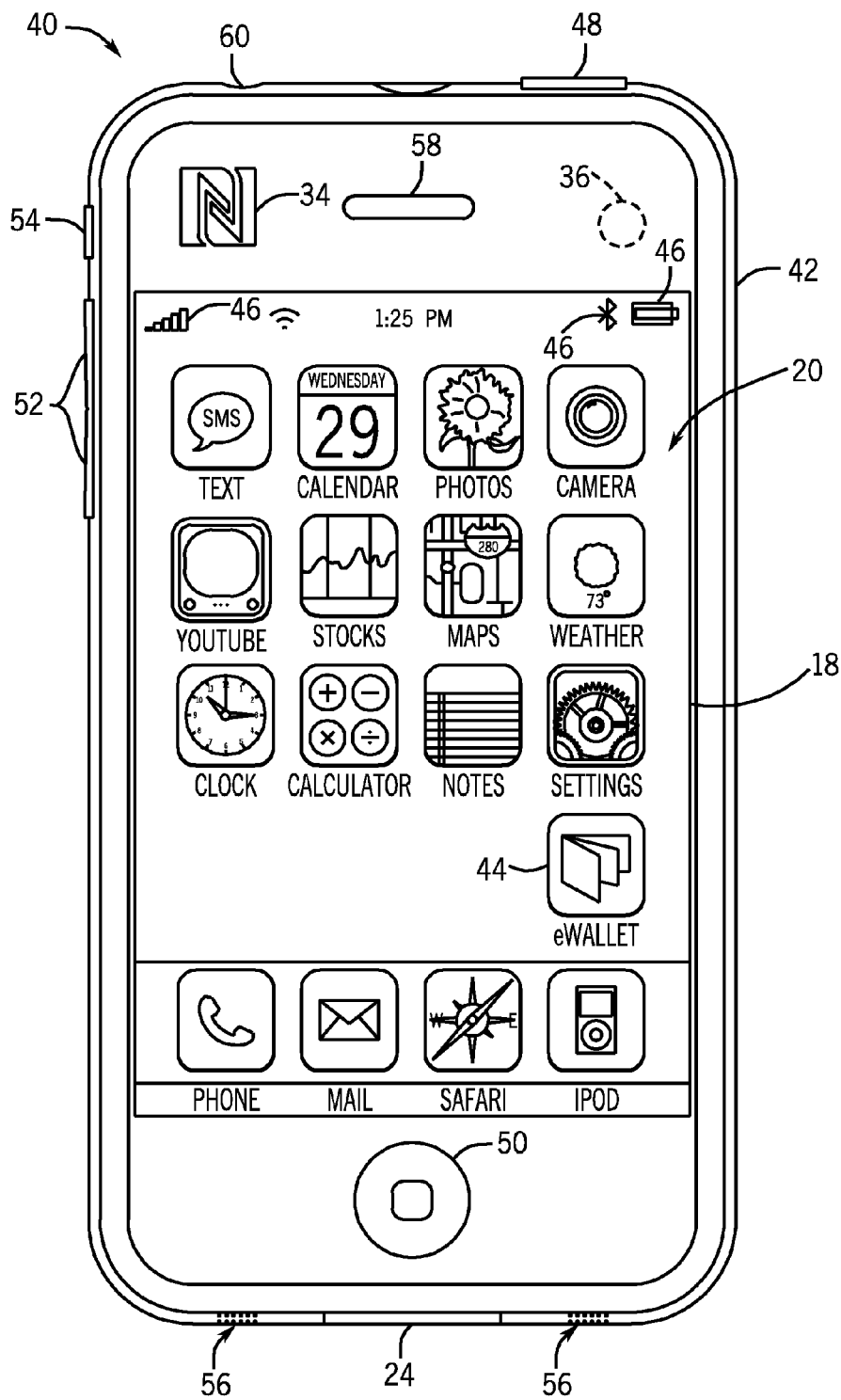
FIG. 2 is a front view of an embodiment of the electronic device of FIG. 1 in accordance with aspects of the present disclosure.
Figure 3:
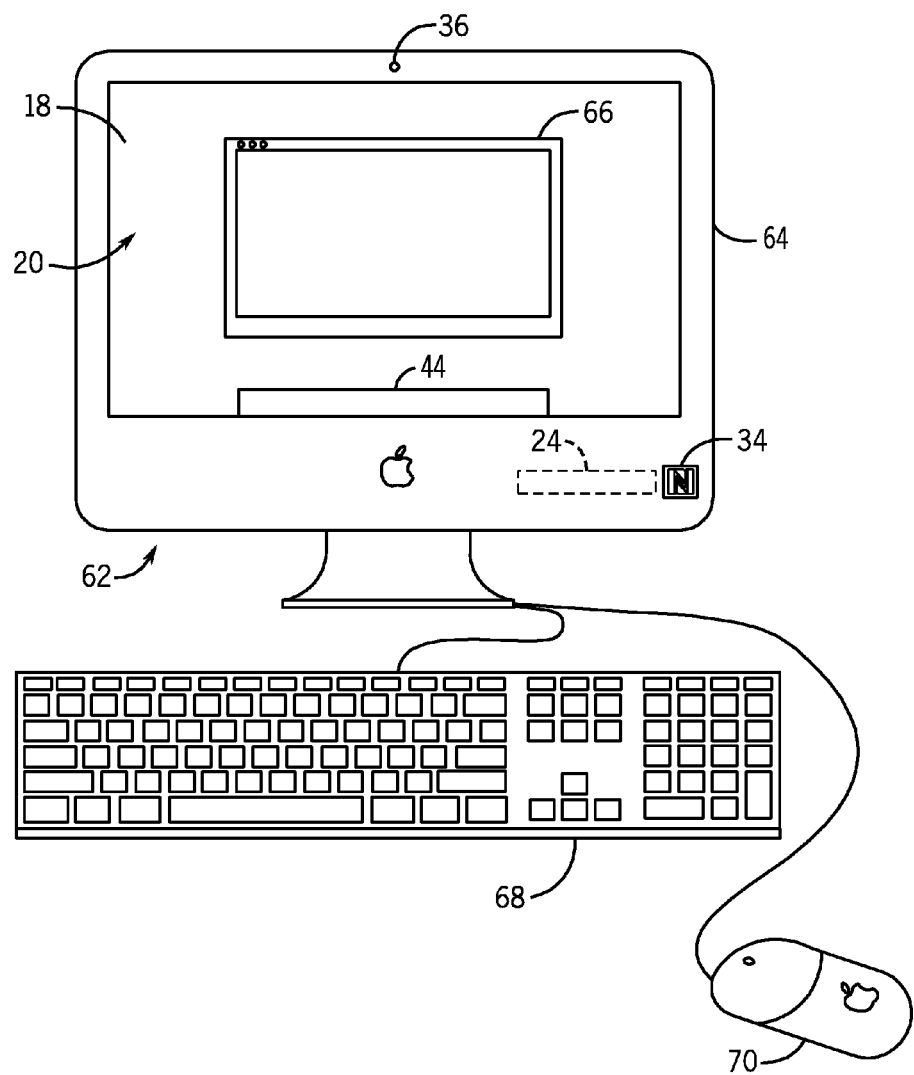
FIG. 3 is a front view of another embodiment of the electronic device of FIG. 1 in accordance with aspects of the present disclosure.

FIGS. 2-3 illustrate various specific embodiments of the electronic device 10 of FIG. 1. For example, the electronic device 10 of FIG. 1 may be a handheld device 40, as illustrated in FIG. 2. The exemplary handheld device 40 may be a portable phone and/or a portable media player, such as an iPhone® or an iPod® available from Apple Inc.

The handheld device 40 may have an enclosure 42 of plastic, metal, composite materials, or other suitable materials in any combination. The enclosure 42 may protect the interior components of the handheld device 40 from physical damage and electromagnetic interference (EMI). Additionally, the enclosure 42 may allow certain frequencies of electromagnetic radiation to pass to and/or from wireless communication circuitry within the handheld device 40 to facilitate wireless communication.

The display 18 of the handheld device 40 may include the user interface 20 in the form of a GUI, which may have a number of individual icons representing applications that may be activated. The user interface 20 on the display 18 of the handheld device 40 may also include certain status indicator icons 46, which may indicate the status of various components of the handheld device 40. For example, the status indicator icons may include a cellular reception meter, an icon to indicate when the PAN interface 28 is active (e.g., when a Bluetooth® network is in use), or a battery life meter.

In some embodiments, a transaction management application icon 44 may be selectable by a user. For example, the display 18 may serve as a touch-sensitive input device, and icons may be selected by touch. Here, the transaction management application icon 44 is designated as "eWallet" to indicate to a user that selection of the icon 44 will allow the user to review and/or manage financial transactions, such as cardholder-not-present transactions. When the transaction management application icon 44 is selected, the transaction management application may open, as described further below. The transaction management application may enable a user to review and authorize or decline in-progress and completed cardholder-not-present transactions.

The handheld device 40 may connect to another electronic device 10, such as a computer, through the wired I/O interface 24. For example, the wired I/O interface 24 may be a proprietary connection for coupling the handheld device 40 to another electronic device 10 via USB or FireWire®. Once connected, the devices 10 may synchronize and/or transfer certain data, such as card information and/or transactions, in accordance with techniques discussed herein.

User input structures 48, 50, 52, and 54 may supplement or replace the touch-sensitive input capability of the display 18 for interaction with the user interface 20. By way of example, the user input structures 48, 50, 52, and 54 may include buttons, switches, a control pad, keys, knobs, a scroll wheel, or any other suitable input structures. The user input structures 48 and 50 may work in conjunction with the display 18 to control functions of the device. Particularly, the user input structure 48 may be an on/off button; the user input structure 50 may be a navigation button for navigating the user interface 20 to a default or home screen; the user input structures 52 may be a pair of buttons for controlling volume and/or for navigating up and down a screen of the user interface 20; and the user input structure 54 may be a sliding button which mutes the handheld device 40 or which "locks" and "unlocks" the device 40.

In addition, the handheld device 40 may include audio input and/or output structures. For example, audio structures 56 may include one or more microphones for receiving voice data from a user and/or one or more speakers for outputting audio data, such as songs, ringtones, sound tracks associated with videos, voice data received by the handheld device 40 over a cellular network, and so forth. In addition, an audio structure 58 may include a speaker for output audio data, such as voice data received by the handheld device 40 over the cellular network. In certain embodiments, an audio port 60 may also enable connection of peripheral audio input and output devices, such as headsets, speakers, or microphones, for use with the handheld device 40.

As noted above, some embodiments of the electronic device 10 may include the NFC interface 34. The handheld device 40 depicted in FIG. 2 may include the NFC interface 34 in any suitable location within the enclosure 42. Because the NFC interface 34 may permit communication at a very short range, the location of the NFC interface 34 in the handheld device 40 may be indicated on the exterior of the enclosure 42, as illustrated in FIG. 2. The NFC interface 34 may enable the handheld device 40 to communicate with RFID tags and/or other NFC-enabled electronic devices 10. Additionally, the camera 36 may be located, for example, on the back of the handheld device 40.

The handheld device 40 may also include the location sensing circuitry 22 and/or the accelerometers 38. Certain applications running on the handheld device 40 may obtain information about the location, orientation, and/or movement of the handheld device from the location sensing circuitry 22 and/or the accelerometers 38. This information may enable applications, such as a transaction management application as discussed herein, to display personalized data or to display data in an innovative manner in response to a user's location and/or movement.

Another embodiment of the electronic device 10 of FIG. 1 may be a computer 62, as illustrated in FIG. 3. The computer 62 may be any computer, such as a desktop computer, a server, or a notebook computer, but may also be a standalone media player or video gaming machine. By way of example, the computer 62 may be an iMac®, a MacBook®, or an AppleTV® by Apple Inc. In addition, the computer 62 may be a personal computer (PC) from another manufacturer. An enclosure 64 may protect internal components of the computer 62. Such internal components may include, for example, the CPU 12, the main memory 14, the nonvolatile storage 16, certain network interfaces 26, and/or the NFC interface 34, as illustrated in FIG. 1.

The NFC interface 34 may permit near field communication between the computer 62 and other NFC enabled electronic devices 10, such as the handheld device 40. Accordingly, the location of the NFC interface 34 within the enclosure 64 may be noted by a label on the exterior of the enclosure 64 to enable positioning of other NFC enabled electronic devices 10 within the short range of the NFC interface 34.

The user interface 20 may be displayed on the display 18 of the computer 62 in the form of a GUI. The user interface 20 may display, for example, user interfaces for applications 66 running on the computer 62. Additionally, the user interface 20 may include a variety of icons related to applications installed on the computer 62, such as the travel management application icon 44. When the transaction management application icon 44 is selected, another version of the transaction management application optimized for the computer 62 may open. The transaction management application may enable a user to review and approve or cancel cardholder-not-present transactions, as described further herein.

A user may interact with the user interface 20 via various peripheral input devices, such as a keyboard 68 and/or a mouse 70. Peripherals may connect to the computer 62, for example, via the wired I/O interface 24 and/or the PAN interface 28 (e.g., Bluetooth®). The wired I/O interface 24 may also provide a high bandwidth communication channel for coupling other electronic devices 10, such as the handheld device 40, to the computer 62. The computer 62 may also include the camera 36.

Figure 4:
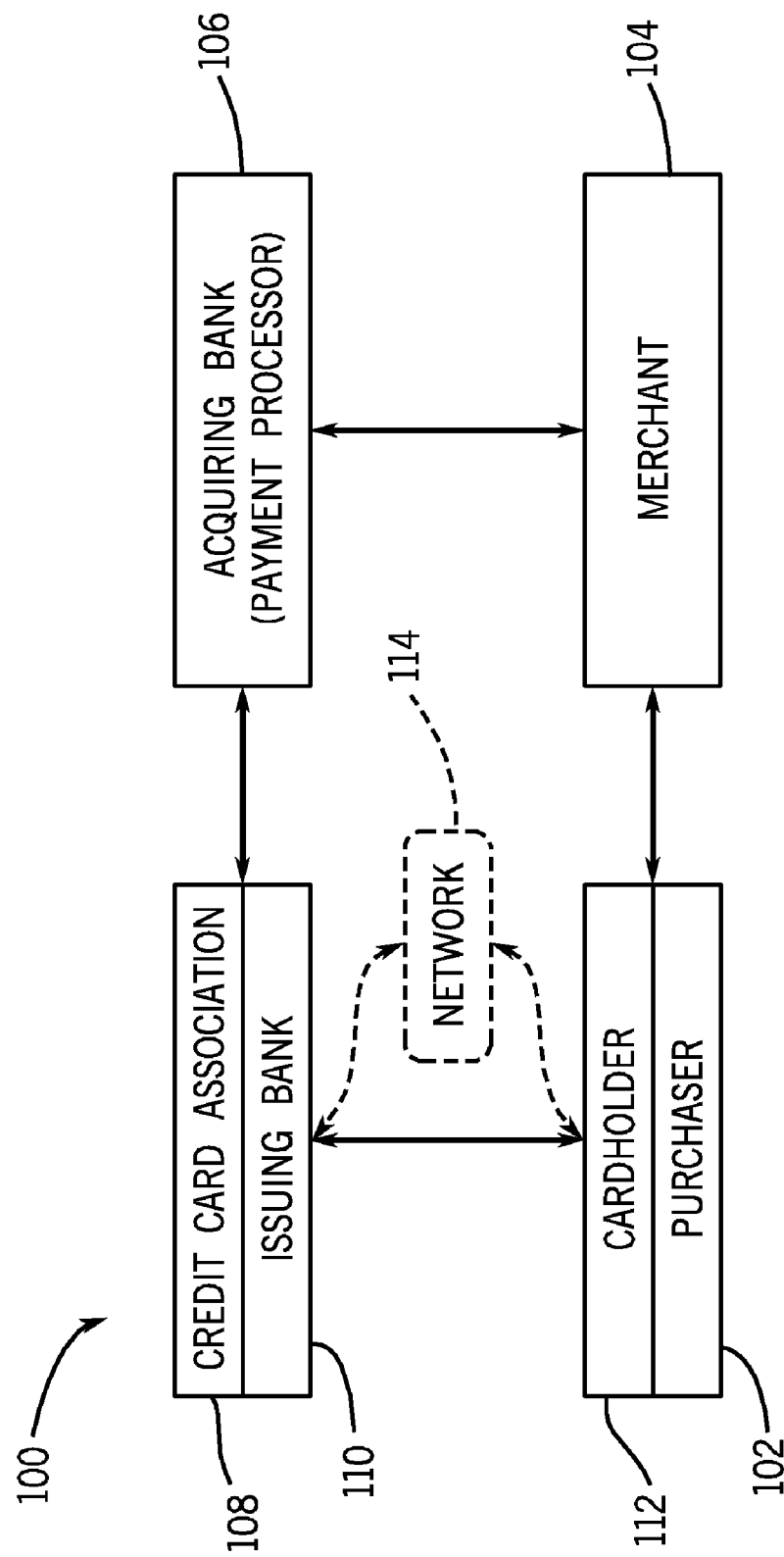
FIG. 4 is a schematic diagram of participants in a cardholder-not-present financial transaction in accordance with aspects of the present disclosure.

Turning to FIG. 4, a schematic diagram 100 illustrates exemplary participants and their relationships in a cardholder-not-present financial transaction. For example, a purchaser 102 may place an order with a merchant 104. The merchant 104 may be, for example, an online vendor, a mail-order company, or any seller who accepts card payments without the card present. For illustrative purposes, the purchaser 102 may place an order with an online merchant 104, such as Amazon.com. The purchaser 102 may select one or more items to purchase and enter payment information. The payment information may be in the form of a credit card, a debit card, a gift card, a store credit, or any other payment form accepted by the merchant 104. In addition, the payment information may be stored by the merchant 104, or the purchaser 102 may enter the information at the time of purchase. If the purchaser 102 elects to make a purchase with a credit card, for example, the purchaser 102 may enter a credit card number, expiration date, and a card security code (e.g., card verification value (CVV), card verification value code (CVVC), card verification code (CVC), verification code (V-Code), credit card ID (CCID), and so forth). The card security code may be, for example, printed on the card (e.g., the signature strip or the card face) but not encoded on the card's magnetic stripe. In addition to this card information, the merchant 104 may request the cardholder's name and billing address for security purposes. However, purchases may generally be shipped to a shipping address which can be different from the billing address associated with the card.

After the purchaser 102 has chosen items for purchase and entered payment information, the merchant 104 may forward the payment information and an authorization request to an acquiring bank 106. Also known as a payment processor, the acquiring bank 106 is the merchant bank. The acquiring bank 106 forwards the authorization request to a credit card association 108 and/or an issuing bank 110. The credit card association 108 and issuing bank 110 may be a single entity or separate entities. For example, American Express is both a credit card association 108 and an issuing bank 110. In contrast, Visa and MasterCard are credit card associations 108, and they work in cooperation with issuing banks 110, such as Chase, Wells Fargo, Bank of America, and so forth. In the case of separate entities, the credit card association 108 may receive the authorization request from the acquiring bank 106 and forward the request to the issuing bank 110; in some instances, the acquiring bank 106 may submit the authorization request directly to the issuing bank 110. Furthermore, the credit card association 108 may respond on behalf of the issuing bank 110 according to conditions agreed upon between the credit card association 108 the issuing bank 110.

When the issuing bank 110 receives an authorization request, the payment information and purchase amount included in the authorization request are analyzed to determine if the account has enough credit to cover the purchase. For example, if an authorization request for $1,920.01 is received from Amazon.com, the issuing bank 110 may determine the limit on the associated account and/or the amount of money available in the associated account. If insufficient funds are present, the issuing bank 110 may decline the transaction in an authorization response to the acquiring bank 106. The acquiring bank 106 may then notify the merchant 104 that the payment has been declined, and the merchant 104 may prompt the purchaser 102 to provide correct account information, use a different payment method, or cancel the transaction.

If, upon receiving the authorization request, the issuing bank 110 determines that sufficient funds are available, the issuing bank 110 and/or the credit card association 108 may then forward the authorization request to a cardholder 112 for approval or denial. The authorization request may be forwarded to the cardholder 112 based on a flag on the account, comparison of the account to a database of registered accounts, and so forth. The cardholder 112 may be, for example, a single account holder, a primary account holder, a joint account holder who has opted to receive cardholder-not-present authorization messages, and so forth. In addition, the cardholder 112 may be the purchaser 102. However, if the purchaser 102 is an authorized or unauthorized account user, the cardholder 112 and the purchaser 102 may be different people.

Furthermore, in some embodiments, the issuing bank 110 and/or the credit card association 108 may send the authorization request directly to the cardholder 112 over a public network infrastructure, such as the Internet or a cellular network. In other embodiments, the issuing bank 110 may submit the authorization request to the cardholder 112 through a dedicated network 114 infrastructure that may not be publicly accessible or may be only partially publicly accessible and which may be available when using the transaction management application on device 10. The authorization request may be submitted to the cardholder 112 via the electronic device 10 (FIG. 1). For example, the authorization request may be sent to the handheld device 40 (FIG. 2) and/or the computer 62 (FIG. 3). As will be discussed further below, the authorization request may be presented to the cardholder 112 via an application, such as a dedicated cardholder-not-present authorization application, a broader financial application (e.g., an eWallet application), or a synchronization application used to maintain a handheld device in sync with user specified preferences and content (e.g., iTunes available from Apple Inc.).

The authorization request to the cardholder 112 may include, for example, information pertinent to the cardholder's 112 decision to approve or deny the transaction authorization. For example, in one embodiment, the information may include the transaction amount, the payment method (e.g., the name of the card being used), and the name of the merchant. Additional information which may be included in the authorization request may include, for example, the internet protocol (IP address) of the purchaser 102, the shipping address for the order, a detailed list of all of the items included in the transaction, and so forth. Based on the provided information, the cardholder 112 may elect to approve or deny the authorization request. Exemplary techniques for submitting the cardholder's 112 authorization response are discussed in more detail below.

Additionally, in some embodiments, the credit card association 108 may send the authorization request directly to the cardholder 112 and to the issuing bank 110. The card association 108 may then apply an AND condition to the responses from the issuing bank 110 and cardholder 112. That is, if either the cardholder 1120R the issuing bank 110 declines the payment, the credit card association 108 sends a "declined" message to the acquiring bank 106. If the cardholder 112 does not respond to the request for authorization within a brief predefined period of time, the card association 108 may evaluate the cardholder's 112 predefined rules for how missed authorizations should be treated, as described in more detail below. The credit card association 108 may then approve or decline the transaction accordingly.

Figure 5:
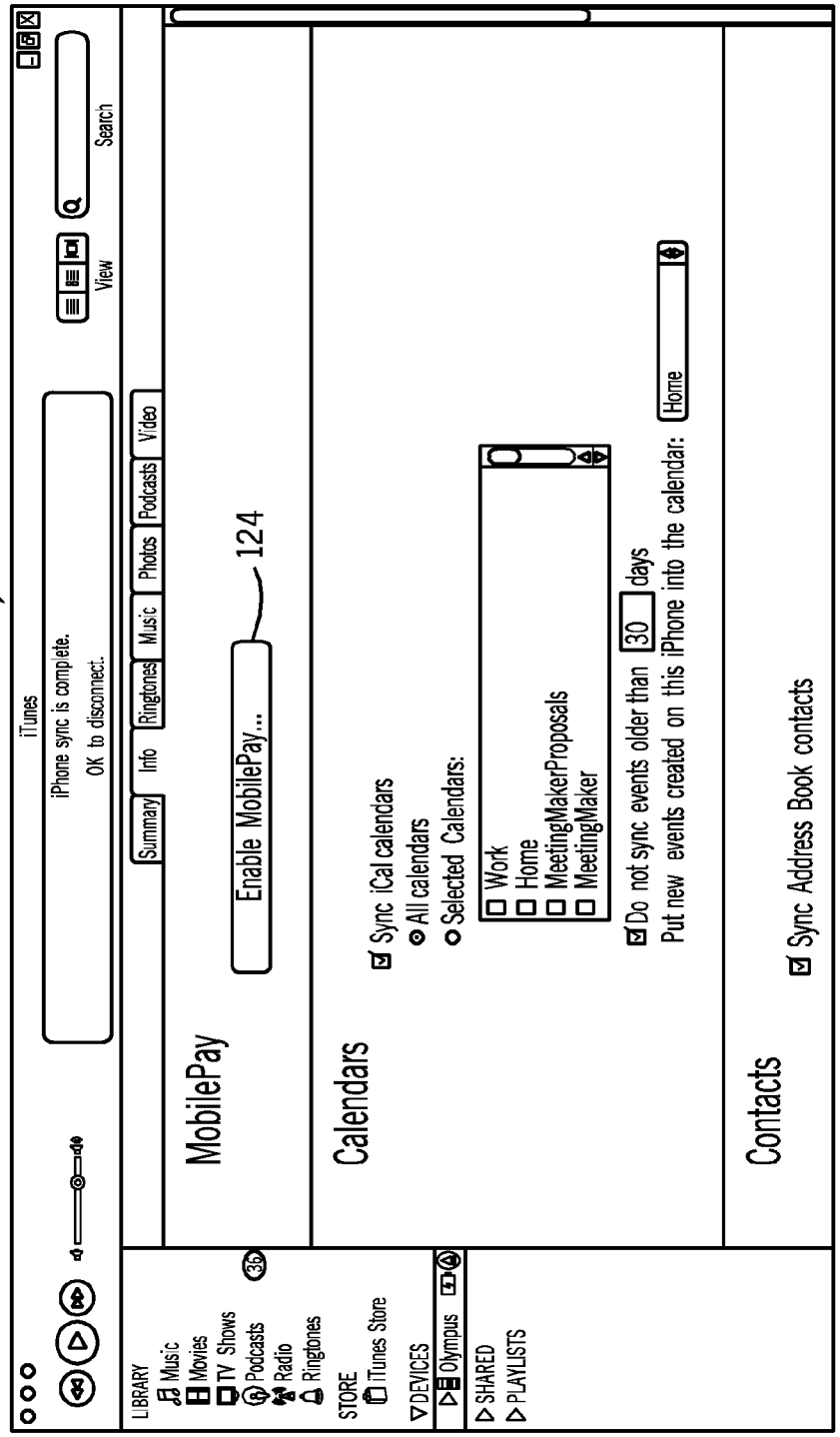
FIGS. 5-7 are screen shots of an application for registering a card for cardholder-not-present authorization in accordance with aspects of the present disclosure.
Figure 6:
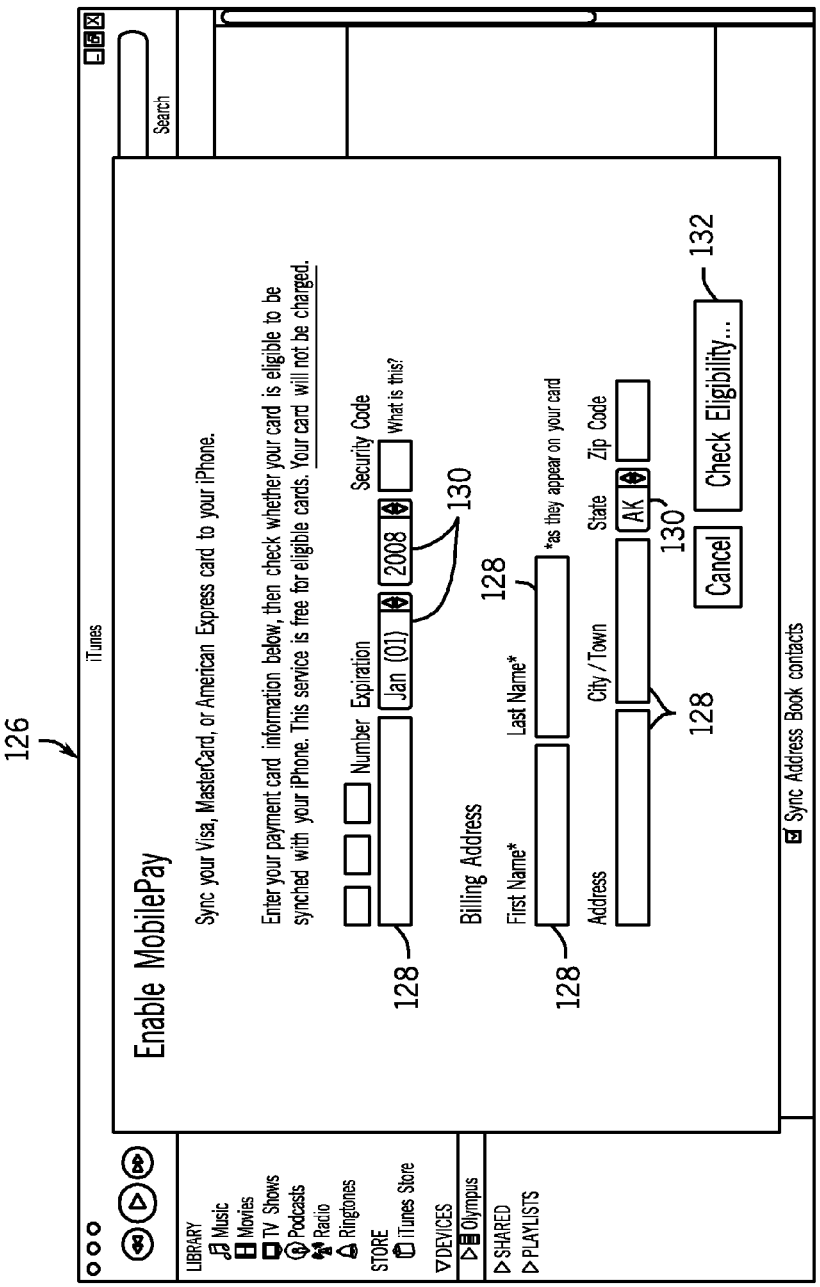
Figure 7:
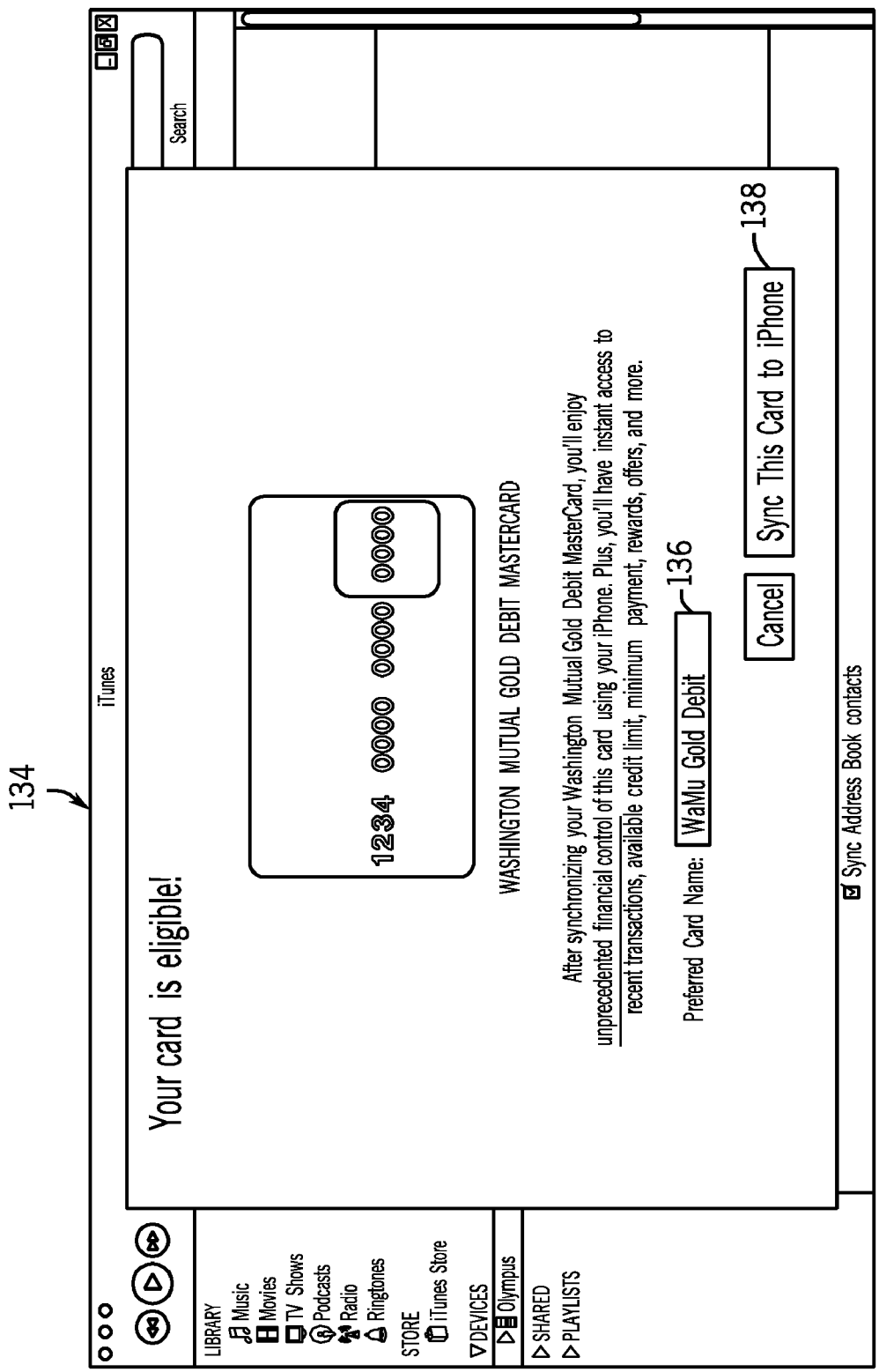
Figure 9:
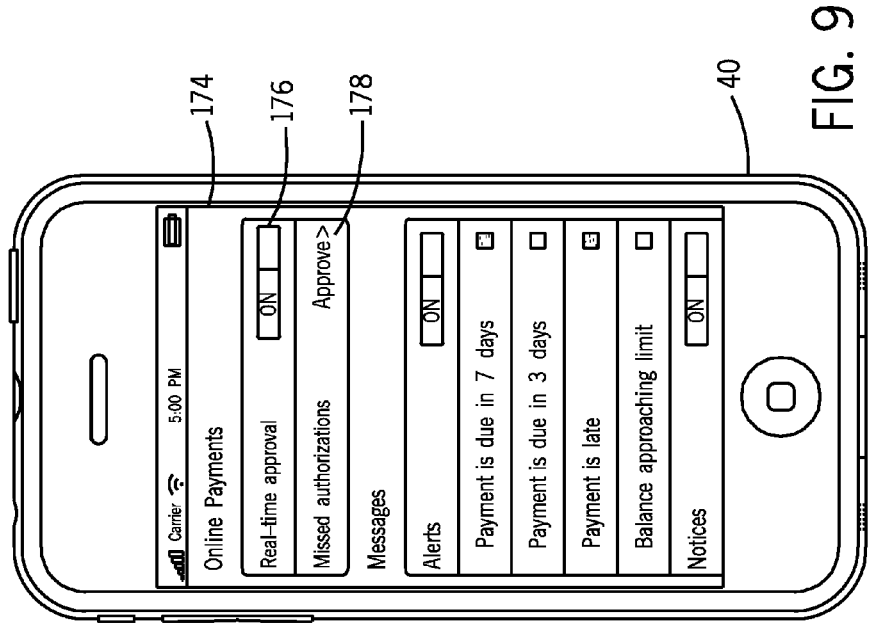
FIGS. 9-13 are screen shots of the application of FIG. 8 illustrating exemplary settings for remote authorization of cardholder-not-present transactions in accordance with aspects of the present disclosure.

FIGS. 5-7 illustrate an exemplary application 120 which may be used to enter cards into the electronic device 10, such as the computer 62 and/or the handheld device 40, for remote authorization of cardholder-not-present transactions. That is, the cardholder 112 may enter card information for one or more cards into the electronic device 10 and then activate cardholder-not-present authorization for cards which enable such functionality. When cardholder-not-present authorization is activated, the cardholder 112 should receive authorization requests for some or all cardholder-not-present transactions. However, in certain embodiments, the issuing bank 110 and/or the credit card association 108 may choose not to allow the cardholder 112 to decline certain purchases. For example, subscription purchases, transactions that do not involve the shipment of finished goods, transactions from exempted merchants, or transactions that do not meet a minimum dollar value threshold may not be sent to the cardholder 112 for authorization.

Turning to FIG. 5, the illustrated application 120 may run, for example, on the electronic device 10, such as the computer 62 (FIG. 3). A screen 122 shows the application 120. In the illustrated embodiment, the application 120 is iTunes; however, the present techniques may be implemented in other applications. On the screen 122, a button 124 may be selected to enable a financial transaction aspect of the application. Upon selection of the button 124, a screen 126, illustrated in FIG. 6, may be presented to the user to input card information. The card information may include, for example, a card number, expiration date, card security code, cardholder name, and billing address. Once the requisite information is entered into text entry boxes 128 and/or drop-down boxes 130, the user may select a button 132 to check if the entered card is eligible to be managed in the application 120. Accordingly, by entering the card information and selecting the button 132, the application 120 may send a request to determine if the credit card association 108 and/or the issuing bank 110 associated with the entered card information enables account management using the present techniques. In one embodiment, the request may be sent directly to the credit card association 108 and/or the issuing bank 110; in another embodiment, the request may be sent to a third party with a list of eligible credit card associations 108 and/or issuing banks 110. For example, in the case where the application 120 is iTunes, Apple Inc. or a third party may maintain a list of credit card associations 108 and/or issuing banks 110 which participate in account management using the present techniques.

The user may then be notified of whether or not the account associated with entered card information is eligible for management via the present techniques, such as on an exemplary screen 134, illustrated in FIG. 7. In addition, the user may be able to enter a nickname for the entered card in a text entry box 136. In some embodiments, the user may also be able to specify or direct that account management be activated on another device 10, such as the handheld electronic device 40, which may be synchronized via the application 120. Such synchronization may be enabled by selection of a button 138.

Figure 8:
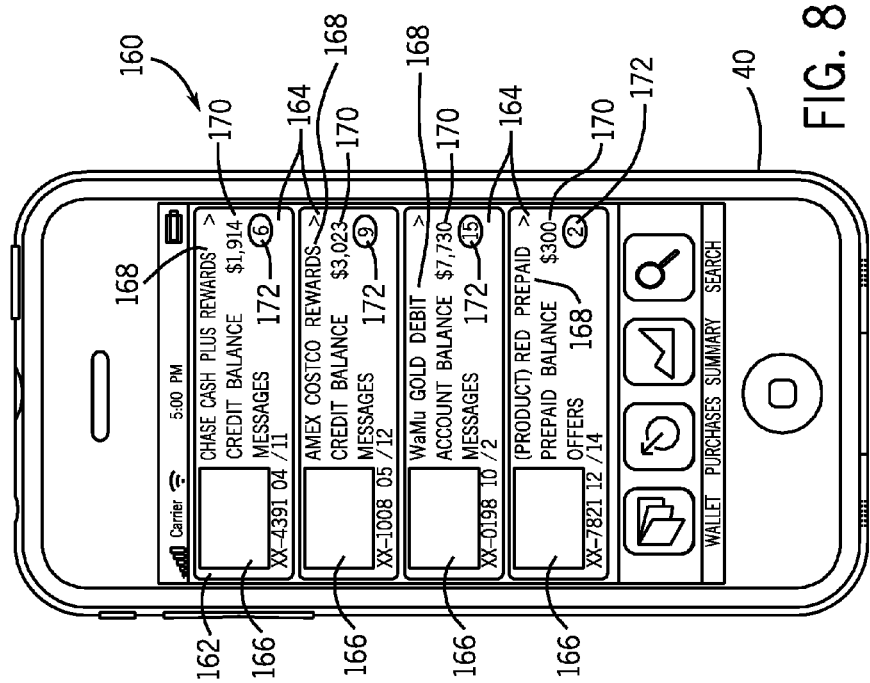
FIG. 8 is a screen shot of an application for remote authorization of cardholder-not-present transactions in accordance with aspects of the present disclosure.
Figure 11:
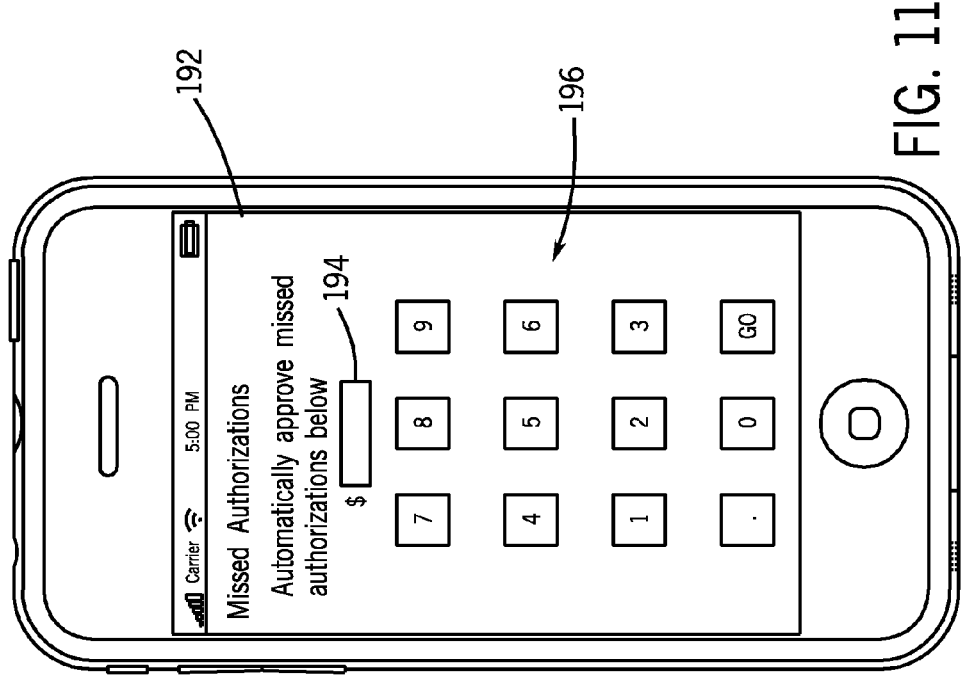

Turning now to FIGS. 8-13, an exemplary application 160 which may be used for account management, such as remote authorization of cardholder-not-present transactions, is illustrated. In the illustrated embodiment, the application 160 is implemented on the handheld device 40; however, similar applications may be implemented on various electronic devices, including the computer 62. For example, FIG. 8 shows a screen 162 which lists a number of accounts 164 which may be managed via the handheld device 40. In the illustrated embodiment, each account 164 may be identified by an image 166, a nickname 168, and account identification information. In addition, a balance 170 associated with the account may be displayed for quick reference. Further, an indicator 172 may show how many messages and/or offers are associated with the account. The messages may include, for example, cardholder-not-present authorization requests, as described in more detail below.

In some embodiments, cardholder-not-present authorization may be automatically activated upon entering the card information and verifying that the card is eligible for account management via the present techniques (FIGS. 6 and 7). In another embodiment, illustrated in FIG. 9, the cardholder 112 (FIG. 4) may activate real-time approval of cardholder-not-present transactions on a settings screen 174. As illustrated, in one implementation the real-time approval of cardholder-not-present transactions may be turned on or off by merely sliding a virtual selector 176 on the screen 174. The option to activate cardholder-not-present authorization may be present on the screen 174 if it is determined that the issuing bank 110 and/or the credit card association 108 associated with the selected account 164 has the necessary messaging capabilities, as described in more detail below. In one embodiment, that determination may be made by the issuing bank 110 and/or the credit card association 108 and communicated directly to the handheld device 40. In another embodiment, the determination may be communicated to a server maintained by a third party, such as Apple Inc., and the third party may in turn communicate with the handheld device 40. Communication between the issuing bank 110 and/or the credit card association 108 and the third party and/or the handheld device 40 may occur through an Application Programming Interface defined by the third party or the handheld device's 40 software. The ability to enable and disable cardholder-not-present authorization via the handheld device 40 may be particularly useful, for example, when the cardholder 112 will not be accessible for an extended period of time (e.g., during a movie or while on a flight). In addition, default authorization responses may be set by selecting a missed authorizations button 178 on the screen 174.

Figure 10:
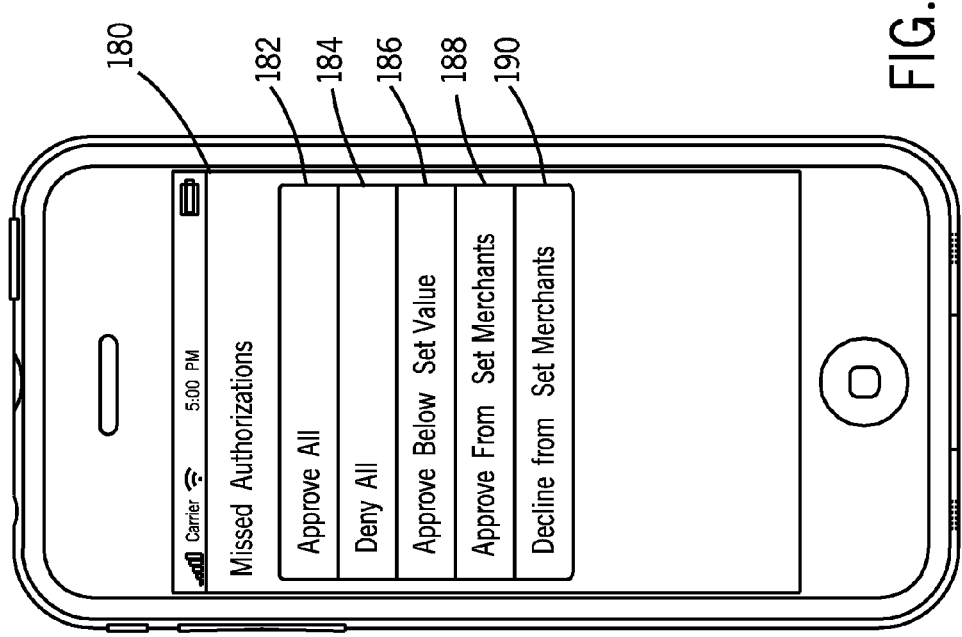

The default authorization responses may be configured via a missed authorizations screen 180, as illustrated in FIG. 10. For example, the cardholder 112 may choose to automatically or provisionally approve all transactions if an authorization request is not responded to within a set period of time by selecting a button 182. Other options may include automatically denying all transactions (button 184); automatically approving transactions under a certain value and denying transactions over that value (button 186); automatically approving or denying transactions from certain merchants (buttons 188 and 190, respectively); and so forth.

Additional setting options may be requested based on the missed authorizations setting selected on the screen 180. For example, if the cardholder 112 selects to approve transactions below a certain value and deny transactions over that value, the desired threshold value may be entered via a screen 192, illustrated in FIG. 11. The desired threshold value may be entered into a text entry box 194 via a virtual keypad 196. In some embodiments, the threshold value may the value above which transactions will be automatically denied; in other embodiments, the value may be the value below which transactions will be automatically approved. In addition, the approval or denial range may be inclusive or exclusive of the threshold value.

Figure 12:
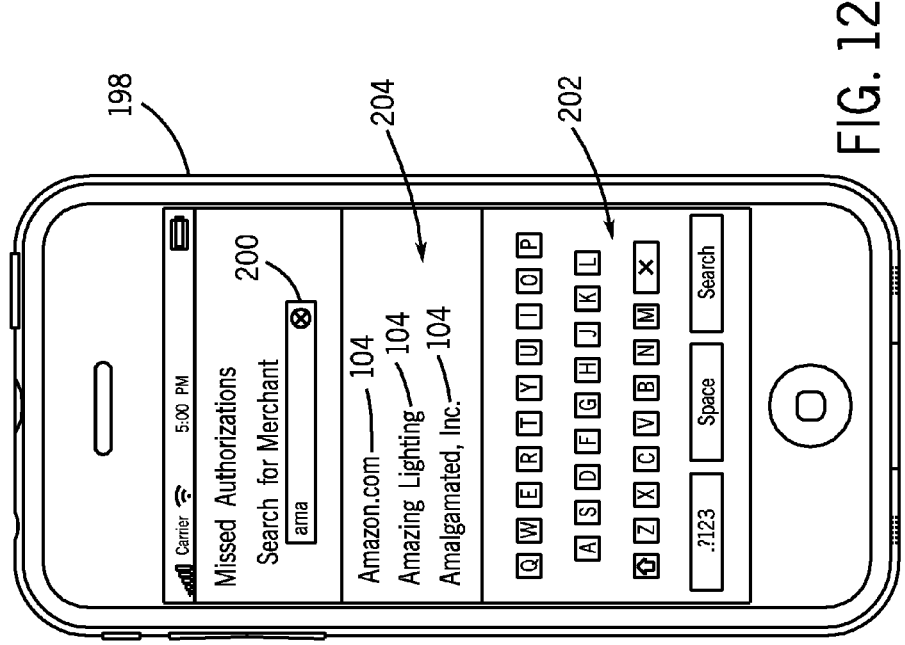

In another example of additional settings being entered, the cardholder 112 may specify certain merchants 104 for whom transactions should be automatically approved or denied if an authorization request is missed. For example, if the cardholder 112 selects button 188 (FIG. 10) to approve missed authorizations from certain merchants, a merchant entry screen 198 may be presented, as illustrated in FIG. 12. In the illustrated embodiment, the user may enter a merchant name or standard industrial classification (SIC) code in a text entry box 200 via a virtual keyboard 202. In order to improve the accuracy of data entry, a list 204 of known merchants 104 based on prior purchases and/or popular merchants may be searched based on the entered text. The cardholder 112 may then select the merchant's 104 name or SIC code from the list 204. In another embodiment, the cardholder 112 may directly enter the merchant name, and automatic approval/denial of missed authorizations may be based on a comparison of the entered name to the requesting merchant's name. In addition, the cardholder 112 may be presented with an option to enter the merchant's name if the search does not return the desired results.

Figure 13:
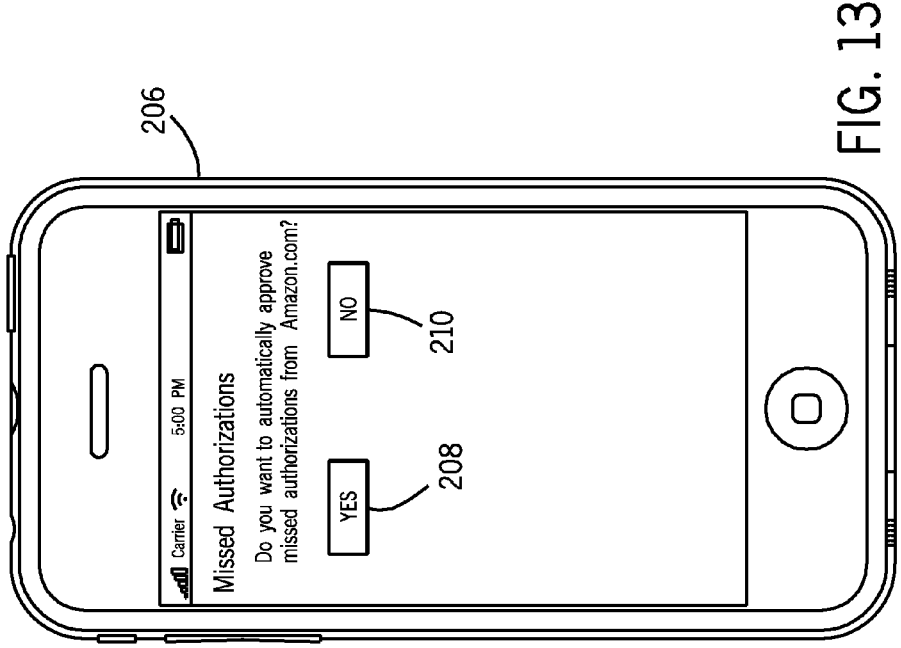

Once the cardholder 112 has selected a merchant 104 from the list 204 or entered the merchant's name directly, the user may be presented with a confirmation screen 206, as illustrated in FIG. 13. The confirmation screen 206 may prompt the cardholder 112 to confirm or cancel the automatic approval/denial of missed authorizations from a particular merchant 104. If the cardholder 112 chooses to confirm the setting, a yes button 208 may be selected; to cancel the setting, a no button 210 may be selected. While FIGS. 12 and 13 are illustrated in terms of automatic or provisional approval of specific merchants 104, similar screens may be used to set merchants 104 for whom missed authorizations are to be automatically denied. In addition, additional automatic responses may be selected, or a combination of multiple responses may be configured. For example, the cardholder 112 may choose to automatically authorize all missed transactions under a certain value unless the authorization request is from a particular merchant or merchants 104.

The missed authorization settings may be configured as described above and stored locally on the electronic device 10. In addition, or alternatively, the settings may be stored at an issuing bank 108, a credit card association 108, or at another site on a network, such as network 104, over which transaction and/or authorization communications travel. For example, the settings may be stored on a server or database at the issuing bank 108, the credit card association 108, or the network 104 where they may be queried and/or implemented in responding to authorization requests from a merchant or acquiring bank. In such an embodiment, if the cardholder 112 configures the missed authorization settings on the electronic device 10, those settings may be automatically uploaded to the a database and/or server at one or more of the issuing bank 108, the credit card association 108, or the network 104 so that the settings on the electronic device 10 and the upload location are consistent. In this manner, if an authorization request is sent to the cardholder 112 while the electronic device 10 is powered off, the automatic response settings may still be put into effect based on the uploaded settings at the issuing bank 108, the credit card association 108, and/or on a server or database on a network 104.

After cardholder-not-present authorization has been activated and configured for a given card, the cardholder 112 may be notified and asked to approve or decline a cardholder-not-present transaction. This authorization request may be, for example, via the application 120, the application 160, and/or an additional application. It should be noted that the transaction authorization application may be running on the electronic device 10 whenever the device is powered on (e.g., the application may run in the background). The authorization request may then be "pushed" to the application in real-time rather than being retrieved only when the cardholder 112 downloads transaction information. In the exemplary embodiment illustrated in FIGS. 14-16, the authorization request may be submitted to the cardholder 112 on the handheld device 40, although the request may also, or instead, be transmitted via the computer 62.

Figure 14:
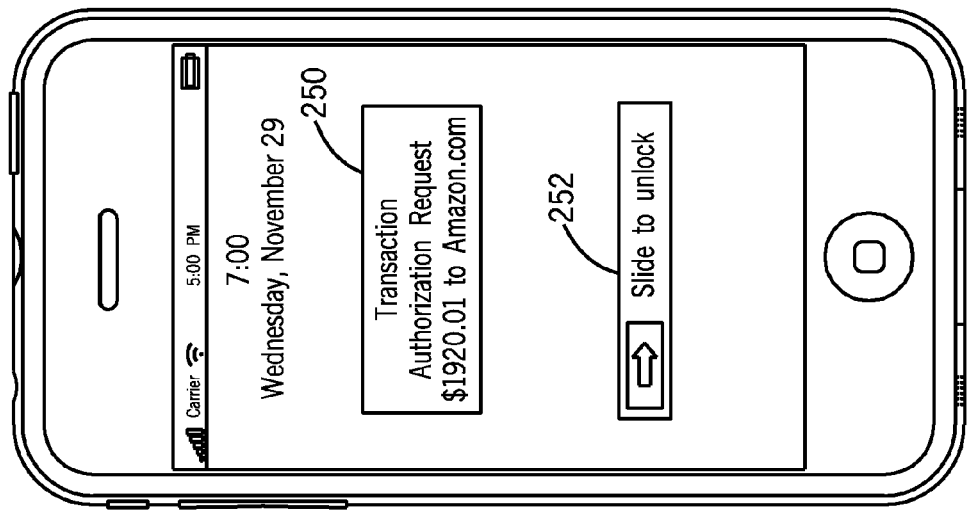

As illustrated in FIG. 14, the cardholder 112 may be notified of an authorization request by a pop-up box 250. In some embodiments, the pop-up box 250 may be accompanied by a sound emitted from the audio structure 56 (FIG. 2) and/or a vibration of the handheld device 40. In addition, the sound may be customizable such that it is distinguishable from a text message (e.g., via short message service (SMS)). The cardholder 112 may activate the handheld device 40 by moving a virtual slider 252. In some embodiments, a passcode (e.g., a personal identification number (PIN)) may also be entered before the handheld device 40 is activated.

Figure 15:
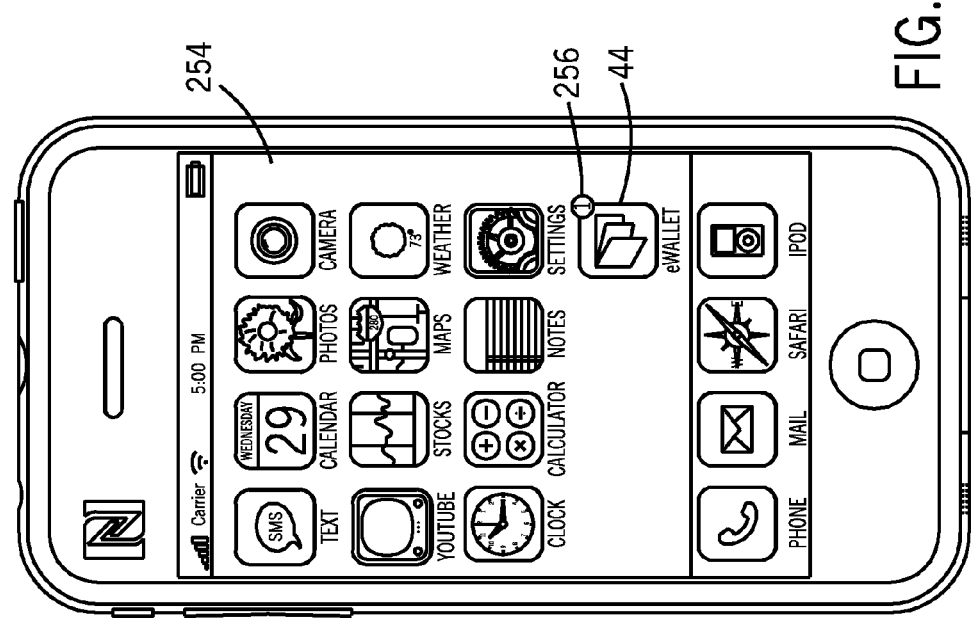
FIGS. 14-16 are screen shots of an application for remote authorization of cardholder-not-present transactions in accordance with aspects of the present disclosure.
Figure 16:
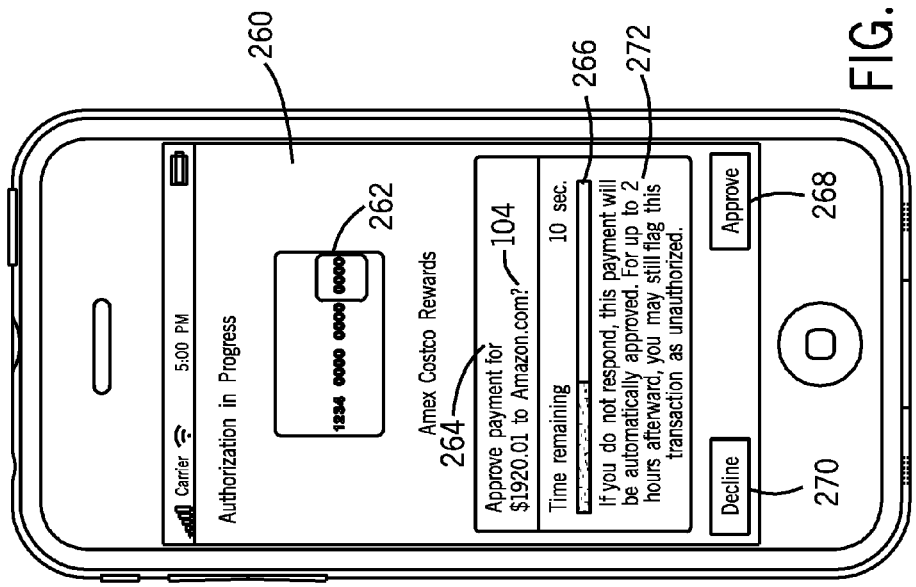

In certain embodiments, after the handheld device 40 is activated, a home screen 254 may be presented, as illustrated in FIG. 15. The home screen 254 may include the transaction management application icon 44. Because an authorization request has been transmitted, the transaction management application icon 44 may include an integrated notification icon 256 to indicate that one or more authorization requests have been received. The user may select the transaction management application icon 44 to access an authorization screen 260, as illustrated in FIG. 16. The authorization screen 260 may include information pertinent to the transaction, such as an indicator 262 of the card being used, the transaction amount 264, and the merchant 104.

In addition, the authorization screen 260 may include a countdown timer 266 illustrating the time remaining for the cardholder 112 to approve or decline the transaction before automatic action is taken, such as by the issuing bank 110 and/or the credit card association 108 or by the electronic device 10 itself. The automatic action may be determined as described above in reference to FIGS. 9-13 and may be based upon rules established by the issuing bank 110 and/or the credit card association 108, by rules uploaded and stored at one or more of these entities by the cardholder, and/or by rules stored on the electronic device 10. The cardholder 112 may approve the transaction request by selecting a button 268 or decline the request by selecting a button 270. Upon selecting the button 268 or 270, the cardholder 112 may be prompted to confirm the selection, or the authorization response may be transmitted immediately.

As described above, the cardholder 112 may have a limited time period in which to approve or deny an authorization request for a cardholder-not-present transaction. This time period may be determined by the merchant 104, the credit card association 108, the issuing bank 110, the cardholder 112, or a combination thereof. The time period may generally be short enough to enable the merchant 104 to approve or deny the purchaser's 102 order almost immediately. For example, the time period may be approximately 20 seconds so that the entire authorization request and response process (FIG. 4) may be performed in less than a minute. In other embodiments, where response time is not an issue, or where the merchant 104 is capable of receiving a "customer decline" message even after receiving an approval code from the issuing bank 110 and/or the credit card association 108, the time period may be longer, such as between about 5 minutes to about 2 hours.

In certain embodiments, the cardholder 112 may be given an additional time period after an automatically approved missed authorization request to flag the transaction as unauthorized. This additional time period may be determined with significant input from, and agreement with, the merchant 104. Generally, the additional time period may be determined based on two competing factors, i.e., fraud prevention and timely shipment of purchased items. That is, the longer the additional time period in which the cardholder 112 may flag an authorization, the greater the opportunity to halt a shipment that the cardholder 112 identifies as fraudulent; whereas the shorter the additional time period, the faster the merchant 104 may move product and recognize revenue. The additional time period may be based on the minimum amount of time between when the merchant 104 receives an authorization for a sale and when the finished goods are shipped or services are performed. For example, if the merchant 104 generally does not ship an item within two hours of receiving an authorization for a sale, the additional time period may be two hours or less. If the merchant 104 has the ability to recall a shipped item in transit, it may be beneficial to increase this additional time period for flagging the transaction up to several days. In other embodiments, rules may be defined that, for example, allow for shorter additional time periods for transactions with a lower dollar value or lower risk, and longer additional time periods for transactions with a higher dollar value or higher risk.

Figure 17:
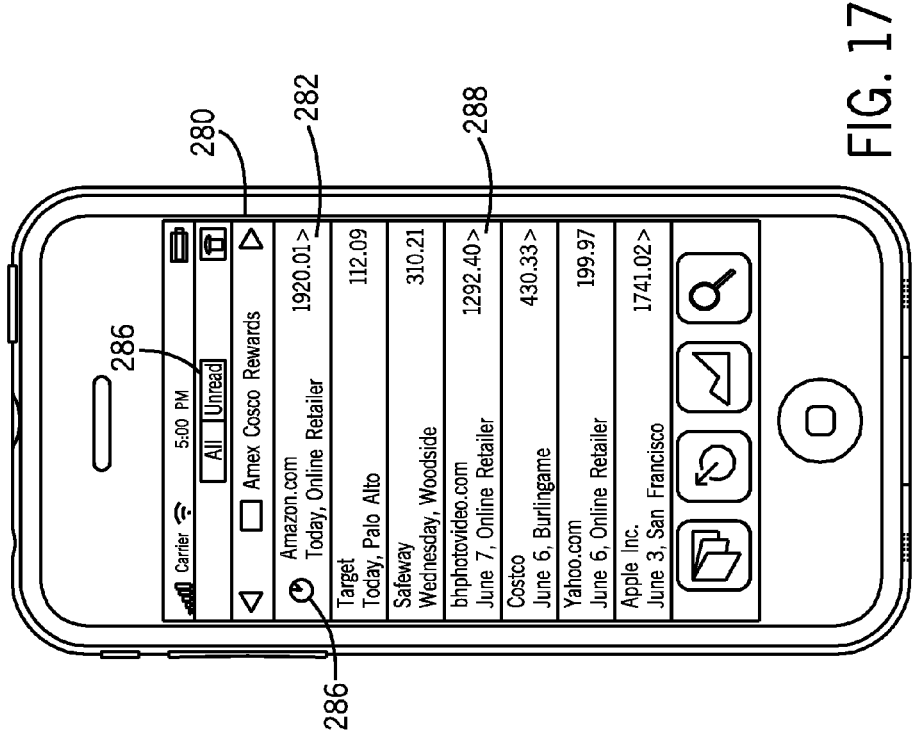
FIGS. 17 and 18 are screen shots of the application of FIGS. 14-16 illustrating flagging of automatically approved cardholder-not-present transactions in accordance with aspects of the present disclosure.

The cardholder 112 may be notified of the option to flag an approved authorization by a message 272 on the authorization screen 260. Accordingly, if an authorization request is automatically or provisionally approved while the cardholder 112 is inaccessible, the transaction may still be flagged and/or cancelled within a certain time period after the automatic approval. The automatically approved transaction may be accessed, for example, via a transaction summary screen 280, as illustrated in FIG. 17. The transaction summary screen 280 may include a list of recent transactions, including automatically approved cardholder-not-present transactions 282. Such transactions may be indicated by a countdown timer 284 illustrating the time remaining for the cardholder 112 to flag an automatically approved authorization request as unauthorized. Additionally, the transactions may be filtered such that only missed authorizations 282 are shown, for example, by selecting a button 286. An arrow 288 may indicate if the transaction information includes additional details.

Figure 18:
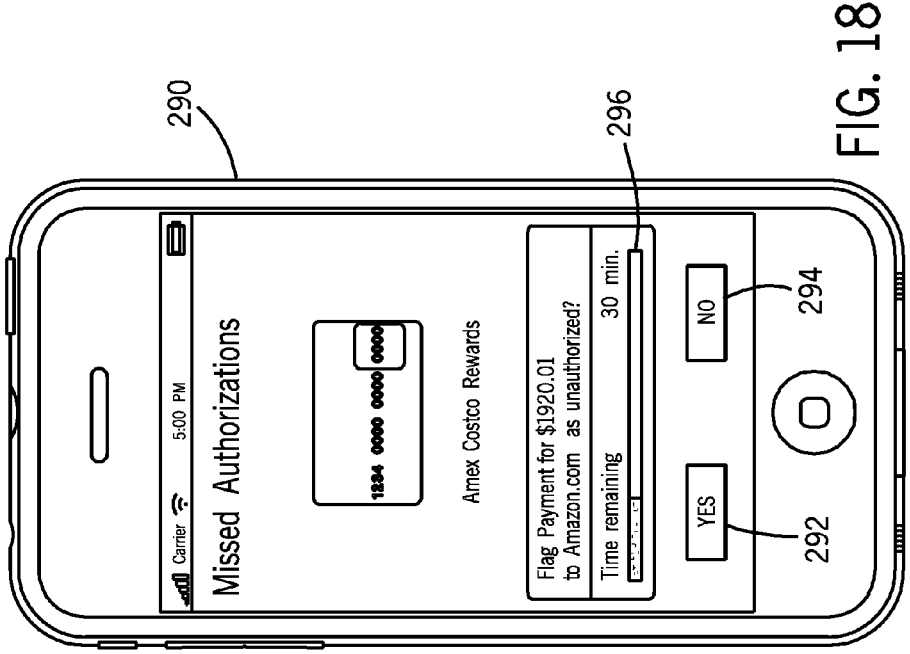

The cardholder 112 may access a transaction flag screen 290, illustrated in FIG. 18, by selecting the countdown timer 284 associated with the desired missed authorization 282 (FIG. 17). As illustrated in FIG. 18, the transaction flag screen 290 may prompt the cardholder 112 to select whether to flag a missed authorization as unauthorized. By selecting a button 292, the cardholder 112 flags the transaction as unauthorized, thereby notifying the merchant 104, the credit card association 108, and/or the issuing bank 110 that unauthorized activity has occurred on the card. The merchant 104 may cancel or recall the order to prevent loss. In addition, the credit card association 108, and/or the issuing bank 110 may flag the account to notify other merchants 104 that the card may be compromised. If the transaction was properly authorized, the cardholder 112 may select a button 294 to end the countdown period for flagging the automatically approved transaction. The time remaining in the countdown period may be indicated by a countdown timer 296.

Figure 19:
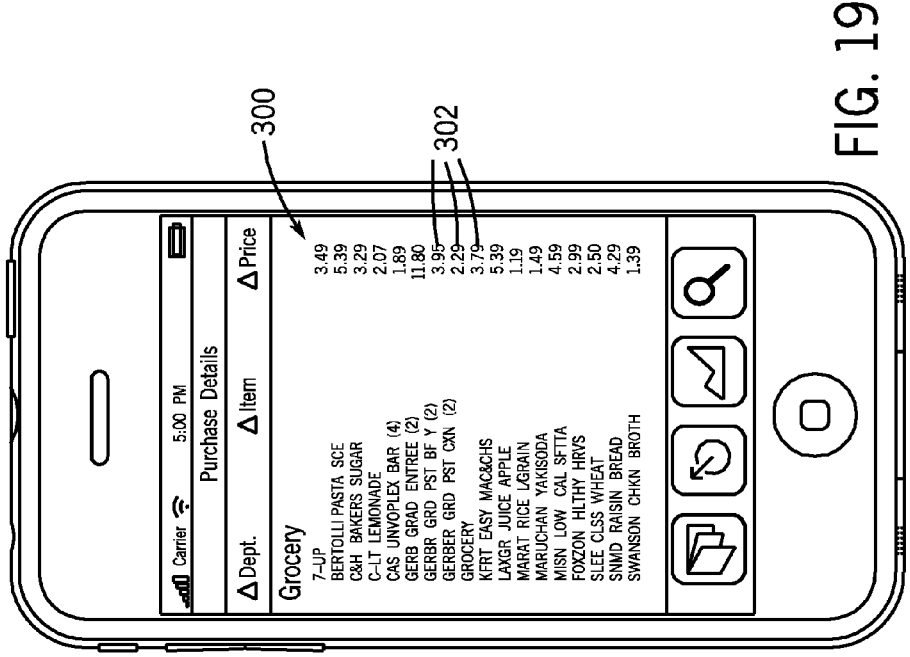
FIG. 19 is a screen shot of the application of FIGS. 14-18 illustrating line item details of a transaction in accordance with aspects of the present disclosure.

Returning to FIG. 17, as indicated above, the cardholder 112 may view further details of a transaction if the arrow 288 indicates that additional information is available. The cardholder 112 may select the arrow 288 to open a transaction detail screen 300, as illustrated in FIG. 19. The transaction detail screen 300 may include line item details 302 indicating the items purchased in the transaction and the price of each item. This information may be useful to the cardholder 112 to determine whether an authorization request should be approved, denied, or flagged.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising:
    receiving an authorization request for a cardholder-not-present transaction on an electronic device;
    prompting a user to input an authorization response on the electronic device;
    generating a manual response when the user provides an input to the electronic device; and
    generating, on the electronic device, an automatic response when the manual response is not input by the user.

2. The method of claim 1, comprising relaying the authorization response to one or both of an issuing bank or a credit card association when the manual response is input by the user within the first predetermined period of time.

3. The method of claim 1, comprising relaying the automatic response to one or both of an issuing bank or a credit card association after a first predetermined period of time.

4. The method of claim 1, comprising enabling the user to flag the cardholder-not-present transaction as unauthorized within a second predetermined period of time.

5. The method of claim 1, comprising relaying to an issuing bank, a credit card association, an acquiring bank, a merchant, or a combination thereof that the flagged cardholder-not-present transaction is unauthorized.

6. An electronic device, comprising:
    a storage structure coded with one or more routines, wherein the routines, when executed cause the following acts to be performed:
        receiving a transaction authorization request comprising information including a merchant name and a transaction amount;
        prompting a user to approve or decline the transaction authorization request;
        upon receipt of a user input in response to the prompt, sending a transaction authorization response to an issuing bank, a credit card association, an acquiring bank, a merchant, or a combination thereof; and
        generating and sending an automatic authorization response when the user-input response is not received within a predetermined period of time and
    a processor configured to execute the one or more routines.

7. The electronic device of claim 6, wherein prompting the user to approve or decline the transaction authorization request comprises displaying the merchant name and the transaction amount on a display of the electronic device.

8. A method, comprising:
    receiving an authorization request for a cardholder-not-present transaction; and
    transmitting a confirmation request to a handheld electronic device specified by an account holder of an account being used in the cardholder-not-present transaction if at least when a user-switchable control on the handheld electronic device is set to allow receipt of the confirmation request by the handheld electronic device.

9. The method of claim 8, wherein the user-switchable control comprises a virtual switch or button displayed on a screen of the handheld electronic device.

10. The method of claim 8, comprising:
    receiving a response to the confirmation request from the handheld electronic device; and transmitting a response to the authorization request based on the response to the confirmation request.

11. The method of claim 8, comprising:

transmitting a specified automated response to the authorization request when a response to the confirmation request is not received from the handheld electronic device within a specified time period.

12. The method of claim 8, wherein the handheld electronic device and the transaction conditions are specified in one or more records encoded in a database.

13. The method of claim 8, comprising:

transmitting a response to the authorization request requesting a confirmation request.

14. A method, comprising:

receiving an authorization request for a cardholder-not-present transaction;

transmitting a confirmation request to an electronic device of an account holder of an account being used in the cardholder-not-present transaction;

receiving a manual response to the authorization request when a response has been entered by a user of the electronic device within a specified time and receiving an automated response to the authorization request generated by the electronic device after the specified time has elapsed and when no response has been entered by the user of the electronic device.

15. The method of claim 14, comprising transmitting a response to the authorization request based on a response to the confirmation request received within the specified time.

16. The method of claim 14, wherein the automated response is determined by preferences previously set by the account holder.

* * * * *